(12) United States Patent
Lewit

(10) Patent No.: US 10,513,100 B2
(45) Date of Patent: *Dec. 24, 2019

(54) CO-CURED GEL COATS, ELASTOMERIC COATINGS, STRUCTURAL LAYERS, AND IN-MOLD PROCESSES FOR THEIR USE

(71) Applicant: COMPOSITES INTELLECTUAL HOLDINGS, INC., Melbourne, FL (US)

(72) Inventor: Scott Lewit, Indialantic, FL (US)

(73) Assignee: COMPOSITES INTELLECTUAL HOLDINGS, INC., Melbourne, FL (US)

( * ) Notice: Subject to any disclaimer, the term of this patent is extended or adjusted under 35 U.S.C. 154(b) by 252 days.

This patent is subject to a terminal disclaimer.

(21) Appl. No.: 15/281,255

(22) Filed: Sep. 30, 2016

(65) Prior Publication Data

US 2017/0050419 A1  Feb. 23, 2017

Related U.S. Application Data

(63) Continuation of application No. 13/743,203, filed on Jan. 16, 2013, now Pat. No. 9,371,468.

(51) Int. Cl.

| | | |
|---|---|---|
| *C09D 163/00* | (2006.01) | |
| *C09D 163/10* | (2006.01) | |
| *C09D 167/06* | (2006.01) | |
| *C09D 175/04* | (2006.01) | |
| *B32B 27/40* | (2006.01) | |
| *B29C 41/00* | (2006.01) | |
| *B32B 27/08* | (2006.01) | |
| *C09D 133/04* | (2006.01) | |
| *C08G 18/68* | (2006.01) | |
| *C08L 75/04* | (2006.01) | |
| *B32B 27/36* | (2006.01) | |
| *B29C 41/22* | (2006.01) | |
| *C09D 133/14* | (2006.01) | |
| *B29K 67/00* | (2006.01) | |
| *B29K 75/00* | (2006.01) | |
| *B29K 105/00* | (2006.01) | |

(52) U.S. Cl.
CPC ............ *B32B 27/40* (2013.01); *B29C 41/003* (2013.01); *B29C 41/22* (2013.01); *B32B 27/08* (2013.01); *B32B 27/36* (2013.01); *C08G 18/683* (2013.01); *C08L 75/04* (2013.01); *C09D 133/04* (2013.01); *C09D 133/14* (2013.01); *C09D 163/00* (2013.01); *C09D 163/10* (2013.01); *C09D 167/06* (2013.01); *C09D 175/04* (2013.01); *B29K 2067/00* (2013.01); *B29K 2067/06* (2013.01); *B29K 2075/00* (2013.01); *B29K 2105/0061* (2013.01); *B32B 2250/02* (2013.01); *B32B 2250/24* (2013.01); *B32B 2262/101* (2013.01); *B32B 2262/106* (2013.01); *B32B 2307/51* (2013.01); *B32B 2307/546* (2013.01); *B32B 2307/558* (2013.01); *Y10T 428/31511* (2015.04); *Y10T 428/31554* (2015.04)

(58) Field of Classification Search
CPC .. C09D 163/00; C09D 163/10; C09D 167/06; C09D 175/04
See application file for complete search history.

(56) References Cited

U.S. PATENT DOCUMENTS

| | | | |
|---|---|---|---|
| 3,367,992 | A | 2/1968 | Bearden et al. |
| 3,996,307 | A | 12/1976 | Najvar et al. |
| 4,197,390 | A | 4/1980 | Jackson |
| 4,280,979 | A | 7/1981 | Dunleavy et al. |
| 4,296,220 | A | 10/1981 | Seeburger et al. |
| 4,302,553 | A | 11/1981 | Frisch et al. |

(Continued)

FOREIGN PATENT DOCUMENTS

| | | |
|---|---|---|
| EP | 1762581 | 3/2007 |
| FR | 2858329 | 2/2005 |

(Continued)

OTHER PUBLICATIONS

Sonnenschein, Polyurethanes: Science, Technology, Markets, and Trends, Chapter 1, John Wiley & Sons. (Year: 2014).*

(Continued)

*Primary Examiner* — Ramsey Zacharia

(74) *Attorney, Agent, or Firm* — Brannon Sowers & Cracraft PC

(57) ABSTRACT

Co-cured urethane and vinyl ester, epoxy, or unsaturated polyester gel coats having improved toughness and flexibility compared with conventional polyester gel coats are disclosed. The gel coats, which have 10-50 wt. % urethane content, adhere well to structural layers and can be used in a traditional in-mold process. Co-cured elastomeric coatings comprising from 50 to 95 wt. % of a urethane component and an unsaturated polyester, epoxy, or vinyl ester are also disclosed. Unlike conventional urethane coatings, the elastomeric coatings adhere well to structural layers and can be used in a traditional in-mold process. Castings or structural layers comprising a reinforced thermoset of co-cured urethane and vinyl ester, epoxy, or unsaturated polyester components, including 10-95 wt. % of the urethane component, are also described. The invention includes in-mold processes for making laminates that utilize the gel coats, elastomeric coatings, and/or structural layers. The in-mold process gives flexible, durable, urethane-containing laminates having good interlayer adhesion.

26 Claims, No Drawings

(56) References Cited

U.S. PATENT DOCUMENTS

| | | |
|---|---|---|
| 4,822,849 A | 4/1989 | Vanderlaan |
| 4,892,919 A | 1/1990 | Leitheiser et al. |
| 4,921,658 A | 5/1990 | Pennington et al. |
| 4,923,934 A | 5/1990 | Werner |
| 4,997,705 A | 3/1991 | Caprette, Jr. et al. |
| 5,096,640 A | 3/1992 | Brody et al. |
| 5,153,261 A | 10/1992 | Brooks |
| 5,159,044 A | 10/1992 | Bogner |
| 5,281,634 A | 1/1994 | Hesse et al. |
| 5,296,544 A | 3/1994 | Heise et al. |
| 5,296,545 A | 3/1994 | Heise |
| 5,302,634 A | 4/1994 | Mushovic |
| 5,344,852 A | 9/1994 | Brooks et al. |
| 5,369,147 A | 11/1994 | Mushovic |
| 5,382,626 A * | 1/1995 | Credali .............. C08G 18/0885 156/166 |
| 5,464,919 A | 11/1995 | Sinclair |
| 5,508,315 A | 4/1996 | Mushovic |
| 5,604,266 A | 2/1997 | Mushovic |
| 5,756,600 A | 5/1998 | Okumura et al. |
| 5,821,296 A | 10/1998 | Borden |
| 5,872,196 A | 2/1999 | Murata et al. |
| 5,919,844 A | 7/1999 | Shimizu et al. |
| 5,936,034 A | 8/1999 | Smith |
| 5,952,436 A | 9/1999 | Cai et al. |
| 6,159,414 A | 12/2000 | Tunis, III et al. |
| 6,211,259 B1 | 4/2001 | Borden et al. |
| 6,451,430 B1 | 9/2002 | Smith |
| 6,660,373 B2 | 12/2003 | Hsu et al. |
| 6,780,923 B2 | 8/2004 | Guha et al. |
| 6,797,102 B2 | 9/2004 | Garcia et al. |
| 7,150,915 B2 | 12/2006 | Kia et al. |
| 7,189,345 B2 | 3/2007 | Sewell et al. |
| 7,217,771 B2 | 5/2007 | Setiabudi |
| 7,638,085 B2 | 12/2009 | Caiazzo |
| 7,980,840 B2 | 7/2011 | Burchardt et al. |
| 9,371,468 B2 * | 6/2016 | Lewit .................. C09D 133/04 |
| 2006/0287463 A1 | 12/2006 | Wehner |
| 2007/0001343 A1 | 1/2007 | Pulman et al. |
| 2007/0049686 A1 | 3/2007 | Bauchet |
| 2008/0160307 A1 | 7/2008 | Bauchet et al. |

FOREIGN PATENT DOCUMENTS

| | | |
|---|---|---|
| JP | 2011063724 | 3/2011 |
| WO | 2004013236 | 2/2004 |
| WO | 2006091446 | 8/2006 |

OTHER PUBLICATIONS

Ramis, X., Cadenato, A., Morancho, J. M., & Salla, J. M. (2001). Polyurethane-unsaturated polyester interpenetrating polymer networks: thermal and dynamic mechanical thermal behaviour. Polymer, 42(23), 9469-9479.
Wang, G. Y., Wang, Y. L., & Hu, C. P. (2000). Interpenetrating polymer networks of polyurethane and graft vinyl ester resin: polyurethane formed with toluene diisocyanate. European polymer journal, 36(4), 735-742.
W.F. Gum, W. Riese, and H. Ulrich, Reaction Polymers: Polyurethanes, Epoxies, Unsaturated Polyesters, Phenolics, Special Polymers, and Additives; Chemistry, Technology, Applications, Markets, Hanser Publishers, NY (1992), pp. 50-124.
W.F. Gum et al., Reaction Polymers, supra, p. 153-202.
W.F. Gum et al., Reaction Polymers, supra, at pp. 190-194.
W.F. Gum et al., Reaction Polymers, supra, at pp. 125-153.
Stypol & Xycon resins data sheet, CCP Composites, 2009.
Xycon IPN resin systems data sheet, Cook Composites & Polymers, May 2009.
Selby™ N300 CR product data sheet, BASF, 2003.
PCT Int'l Search Report and Written Opinion dated Jul. 2, 2014 for PCT/US2014/010545.
PCT Int'l Preliminary Report on Patentability dated Jul. 21, 2015 for PCT/US2014/010545.
Sonnenschein, Polyurethanes: Science, Technology, Markets, and Trends, Wiley (2015), pp. 1-9 (introduction) and pp. 255-281, 291-293 (Ch. 8).
Sandler et al., Polymer Syntheses, vol. III, Academic Press (1996), Ch. 4, "Polymerization Reactions of Mono- and Diisocyanates," pp. 120-151.
"Rheology Study in Polyurethane Rigid Foams" Wu et al., Huntsman Corporation (2012).
"Fiber Optic FTIR: A Novel PUR/PIR Catalyst Development Tool" McDaniels et al., Polyurethanes Expo 303-12 (1999) (Abstract).
"Design, synthesis and properties of new materials based on densely crosslinked polymers for polymer optical fiber and amplifier applications" Flipsen, University of Groningen 1-230 (2000).
"A Study of the Reaction Kinetics of Polyisocyanurate Foam Formulations using Real-time FTIR" Romero et al., J Cellular Plastics, 41:339-59 (2005).

\* cited by examiner

CO-CURED GEL COATS, ELASTOMERIC COATINGS, STRUCTURAL LAYERS, AND IN-MOLD PROCESSES FOR THEIR USE

CROSS-REFERENCE TO RELATED APPLICATIONS

This application, filed under 35 U.S.C. § 120, is a continuation application of Ser. No. 13/743,203, now U.S. Pat. No. 9,371,468 issued on Jun. 21, 2016, which was filed on Jan. 16, 2013, and for which a divisional application Ser. No. 15/158,411 was filed on May 28, 2016. The disclosures of each of the foregoing are expressly incorporated herein by reference.

FIELD OF THE INVENTION

The invention relates to coatings and structural layers commonly used to fabricate molded products, and in particular to co-cured systems having improved adhesion, toughness, flexibility, and structural performance.

BACKGROUND OF THE INVENTION

Gel coats are used in marine and other applications to provide a smooth, attractive surface to the exterior of fiberglass-reinforced products and to protect laminates from the environment. A gel coat is a surface coating that usually contains pigments, resin, fillers, thixotropic agents, UV stabilizers, and promoters. When applied to a mold surface, it cures with structural layers and reproduces contours of the mold surface while sealing in layers of reinforcing fiber. Most gel coats are formulated using unsaturated polyester, vinyl ester, or epoxy resins. When high performance is needed (as in marine or shower/bath applications), unsaturated polyester resins made from isophthalic acid, maleic anhydride, and neopentyl glycol are often selected.

In a typical in-mold process, a gel coat is sprayed or brushed onto a mold surface and allowed to partially cure. A skin coat of resin is applied and cured, and then structural layers that contain fiber reinforcement are subsequently applied.

Although unsaturated polyester and vinyl ester gel coats are widely used, they tend to be relatively brittle. Because of their lack of toughness, the coatings can crack or chip. In fact, gel coat-related issues account for about half of recreational boat warranty claims.

Polyurethane or polyurea coatings are sometimes used as an alternative to a polyester gel coat. Urethanes offer the potential advantages of improved flexibility and toughness. However, urethanes need to be applied after manufacture. When urethanes are applied in-mold as gel coats, the unsaturated polyester-based structural layers do not adhere well enough to the gel coat. In some cases, it is possible to use a fiber tie coat to create a mechanical bond. For instance, an incompletely saturated spun-bonded polyester fabric can be placed into the uncured urethane coating and allowed to cure, followed by infusion with resin and lamination with structural layers. Here, the unsaturated fabric acts as a mechanical interface between the coating and structural layers. However, although this provides desirable adhesion, it is labor intensive, and in large parts, gaining access to place the tie-coat can be problematic.

Unsaturated polyester structural layers do not bond well to cured urethanes, and even post-applied urethane coatings can delaminate or peel, particularly under hydrodynamic conditions (as in a speedboat). No racer wants to cross the finish line in last place, but especially not while also towing an unsightly "bag" of seawater. Thus, despite the potential flexibility and toughness of urethanes, they have not displaced traditional unsaturated polyester gel coats.

"Hybrid" urethane/polyester systems were developed in the early 1980s at Amoco and were subsequently popularized elsewhere (see, e.g., U.S. Pat. Nos. 4,280,979; 4,822,849; 4,892,919; 5,153,261; 5,159,044; 5,296,544; 5,344,852). Most of these disclosures focus on foams or molded systems, with less emphasis on gel coats, although there is some use of hybrid systems for gel coating (see U.S. Pat. Appl. Publ. Nos. 2007/0049686 and 2008/0160307). The prototypical hybrid system has two components: an "A side," which is a mixture of a polyisocyanate and methyl ethyl ketone peroxide (MEKP, a part of the catalyst used to cure the unsaturated polyester resin); and a "B side," which includes a hydroxyl-terminated unsaturated polyester polyol, styrene, fillers, pigments, a glycol chain extender, a cobalt compound (the other half of the polyester curative), and a tin catalyst (urethane catalyst). When the A and B sides are combined, both polyurethane and polyester curing reactions occur. The hydroxyl-terminated unsaturated polyester polyol participates in both curing processes, as its hydroxyl groups react with the polyisocyanate and its carbon-carbon double bonds react with styrene and the radical curative.

Each of the hybrid systems discussed above requires the synthesis and use of a hydroxyl-terminated unsaturated polyester polyol, a material that is not normally used in either a conventional polyurethane (which uses saturated polyether or polyester polyols) or polyester system (which has unsaturation but not substantial hydroxyl end group content).

Hybrid systems are still available to a limited degree commercially, although in an evolved form. For instance, CCP Composites sells products under the Xycon® mark for use in pultrusion that are "modified thermosetting acrylic resins containing styrene monomer." These are combined with an aromatic prepolymer to produce tough, heat and water-resistant polymers. Hydroxy functionality is frequently introduced by using hydroxyacrylate monomers (hydroxyethyl acrylate, hydroxyethyl methacrylate), which can be pricey. For some disclosures of urethane/acrylate systems, see U.S. Pat. No. 7,150,915 or U.S. Pat. Appl. Publ. No. 2007/0001343.

Co-cured systems of urethanes and polyesters have been described, frequently in the context of academic papers related to the study of properties of interpenetrating networks (IPNs). For just two examples, see X. Ramis et al., Polymer 42 (2001) 9469 or G. Y. Wang et al., Eur. Polym. J. 36 (2000) 735. As noted in the latter paper, a true IPN does not have chemical bonds between the networks, but a co-cured system involving commercial urethane and polyester systems would have some reaction of urethane —NCO groups with polyester —OH groups.

U.S. Pat. No. 5,952,436 describes a co-cured product made by reacting styrene, a polyisocyanate, and a polyetherester resin. The polyetherester resin is made by inserting maleic anhydride into C—O bonds of a polyether polyol.

U.S. Pat. No. 5,936,034 combines a traditional unsaturated polyester gel coat, though incompletely cured, and a co-cured "backer" layer made from an unsaturated polyester resin and an isocyanate-terminated prepolymer.

Despite the wealth of literature related to hybrid systems and IPNs, relatively little commercial success has been achieved with co-cured urethane and unsaturated polyester/vinyl ester resins. Most gel coats are still applied as in-mold coatings with unsaturated polyester resins, and most urethanes are applied as post-manufacture coatings. The issues of relatively poor adhesion between these traditional systems have yet to be completely resolved.

The industry would benefit from the availability of gel coatings that have improved toughness, flexibility, and chip- or crack-resistance compared with unsaturated polyester gel coats. Preferably, these benefits could be achieved without sacrificing good adhesion to structural layers or the convenience of using an in-mold coating process. Ideally, the gel coat could be formulated with commercially available materials, thereby overcoming the need to synthesize a special reactant, as is used in the hybrid systems discussed above. The industry would also value elastomeric coatings having improved adhesion to structural layers and a reduced tendency to delaminate from them compared with traditional urethane coatings. Ideally, the elastomeric coating could be used in an in-mold process. Finally, the industry would benefit from the ability to fabricate fiber-reinforced structural layers that can adhere well to coatings and to each other. Preferably, these layers could also have varying degrees of strain to failure, toughness, stiffness, or flexibility. The ability to "dial in" properties for each layer in a laminate would be valuable.

SUMMARY OF THE INVENTION

In one aspect, the invention relates to a gel coat comprising co-cured urethane and vinyl ester, epoxy, or unsaturated polyester components. The urethane component is from 10 to 50 wt. % based on the amount of gel coat, and the urethane and vinyl ester, epoxy, or unsaturated polyester reactants are combined under conditions effective to cure both components in the same cure cycle. The gel coats have improved toughness and flexibility compared with conventional polyester gel coats, they adhere well to structural layers, and they can be used in a traditional in-mold process.

In another aspect, the invention relates to an elastomeric coating comprising co-cured urethane and vinyl ester, epoxy, or unsaturated polyester components. The urethane component is from 50 to 95 wt. % based on the amount of elastomeric coating. The urethane and vinyl ester, epoxy, or unsaturated polyester reactants are combined under conditions effective to cure both components in the same cure cycle. The elastomeric coatings are flexible and tough, they adhere well to structural layers, and unlike conventional urethane coatings, they can be used in a traditional in-mold process.

In another aspect, the invention relates to a casting which comprises co-cured urethane and vinyl ester, epoxy, or unsaturated polyester components. The urethane component is from 10 to 95 wt. % based on the amount of casting. The urethane and vinyl ester, epoxy, or unsaturated polyester reactants are combined under conditions effective to cure both components in the same cure cycle.

In yet another aspect, the invention relates to a structural layer comprising a reinforced thermoset. The thermoset comprises co-cured urethane and vinyl ester, epoxy, or unsaturated polyester components. The urethane component is from 10 to 95 wt. % based on the amount of thermoset. The urethane and vinyl ester, epoxy, or unsaturated polyester reactants are combined under conditions effective to cure both components in the same cure cycle.

The invention also includes in-mold processes for making laminates. In one process, a gel coat of the invention is used; in another, an elastomeric coating of the invention is used. In each process, a gel coat or elastomeric coating of the invention is first applied to a mold. Before or after the gel coat or elastomeric coating layer cures, at least one structural layer is applied, and the layers are allowed to cure to produce the laminate. In another in-mold process of the invention, a conventional gel coat is applied first. Before or after the gel coat layer cures, at least one inventive structural layer comprising a reinforced thermosetable composition is applied, and the layers are allowed to cure to produce the laminate.

DETAILED DESCRIPTION OF THE INVENTION

Generally, the invention relates to coatings and structural layers used to fabricate molded products, and in particular to co-cured systems having improved adhesion, toughness, and flexibility.

In one aspect, the invention relates to a gel coat. The gel coat comprises co-cured urethane and vinyl ester, epoxy, or unsaturated polyester components. The urethane component is from 10 to 50 wt. % based on the amount of gel coat. The urethane and vinyl ester, epoxy, or unsaturated polyester reactants are combined under conditions effective to cure both components in the same cure cycle.

"Co-cured" means that the reactions involved in producing a urethane polymer (i.e., reaction of a polyisocyanate or NCO-terminated prepolymer with polyols and hydroxy or amine-functional extenders) take place essentially concurrently with reactions involved in converting vinyl ester, epoxy, or unsaturated polyester reactants to cured products. Unsaturated polyester and vinyl ester resins generally react with styrene and free-radical initiators to produce a cured thermoset polyester or vinyl ester. Epoxy resins generally react with "hardeners" or curing agents to produce a cured epoxy component. The co-cured product comprising the urethane and polyester, epoxy, or vinyl ester components is distinguishable from an interpenetrating network (IPN) because there can be some reactions involving chains of each network.

The urethane component is generated from any desired combination of urethane reactants, including polyisocyanates, isocyanate-terminated prepolymers, polyols, and chain extenders, all of which are well known and commercially available. The polyisocyanate can be aromatic or aliphatic. Aromatic polyisocyanates include, e.g., toluene diisocyanates (TDI), 4,4'-diphenylmethane diisocyanates (MDI), or polymeric diisocyanates (PMDI), or the like. Aliphatic polyisocyanates include, e.g., hexamethylene diisocyanate (HDI), hydrogenated MDI, cyclohexane diisocyanate (CHDI), isophorone diisocyanate (IPDI), trimethyl or tetramethylhexamethylene diisocyanate (TMXDI), or the like. Isocyanate-terminated prepolymers are made with any of the above polyisocyanates and a polyol; many prepolymers are commercially available. Suitable polyols have molecular weights from 500 to 10,000 and functionalities from 2 to 6. Typically, these are hydroxyl or amine-terminated polyether or polyester polyols, most commonly a polyether or polyester diol or triol. The polyol can have higher functionalities, as in alkoxylated sucrose polyols or the like. Suitable chain extenders are usually low-molecular-weight diols or diamines such as ethylene glycol, diethylene glycol, 1,4-butanediol, 1,6-hexanediol, ethylene diamine, 4,4'-methylene-bis(2-chloroaniline) ("MOCA"), and the like. The urethane system can be a one- or two-component system. It can be a pure urethane system (i.e., hydroxyl-terminated reactants only), a polyurea (amine-terminated polyols and/or amine extenders), or a combination or mixture of these. For more information about reactants and processes used to make urethane polymers, see W. F. Gum, W. Riese, and H. Ulrich, *Reaction Polymers: Polyurethanes, Epoxies, Unsaturated Polyesters, Phenolics, Special Polymers, and Additives; Chemistry, Technology, Applications, Markets*, Hanser Publishers, NY (1992), especially pp. 50-124.

We found that for purposes of practicing this invention, it is possible and convenient to use fully formulated polyurethane and/or polyurea products. Numerous examples below, for instance, utilize Selby™ N300 CR (product of BASF), a two-component polyurethane based on an aliphatic polyisocyanate and designed for use as a floor coating or its combination with EnviroLastic® resin (product of Sherwin-Williams) or Line-X® resin (Line-X, Inc.), polyureas commonly used to coat truck bed liners. Of course, the skilled person has discretion to customize or formulate the urethane and or urea from the usual building blocks or to simply use commercially available products.

The urethane component is from 10 to 50 wt. %, preferably from 10 to 25 wt. %, based on the amount of gel coat. We surprisingly found that such levels of urethane in the gel coat impart substantial toughness and durability to the gel coat such that cracks and chips can be avoided. This is particularly important in marine applications, where current gel coat technology is limiting due to its brittle nature.

The gel coat also comprises an unsaturated polyester, epoxy, or vinyl ester component. When this component is a polyester or vinyl ester, it is usually generated by combining an unsaturated polyester resin or vinyl ester resin with an ethylenic monomer, usually styrene, and a free-radical initiator. The unsaturated polyester, epoxy, or vinyl ester component of the inventive gel coat can be a conventional gel coat formulation.

Suitable unsaturated polyester resins are well known. They are generally polymers of intermediate molecular weight made by condensing glycols, maleic anhydride, and dicarboxylic acids (or their anhydrides) to give a resin having a targeted acid number. Typical glycols include ethylene glycol, propylene glycol, diethylene glycol, dipropylene glycol, alkoxylated bisphenol A, cyclohexane dimethanol, neopentyl glycol, and the like. The dicarboxylic acid or anhydride can be aromatic, aliphatic, or a mixture of these. Typical examples include phthalic anhydride, isophthalic acid, terephthalic acid, adipic acid, succinic acid, tetrabromophthalic anhydride, tetrahydrophthalic anhydride, maleic acid, fumaric acid, and the like. Maleic anhydride is used to provide a crosslinkable carbon-carbon double bond capable of reacting with the ethylenic monomer in the presence of the free-radical initiator.

Suitable ethylenic monomers include, for example styrene, α-methylstyrene, divinylbenzene, methyl methacrylate, butyl acrylate, vinyl toluene, and the like, or their mixtures. Styrene is preferred.

Preferred unsaturated polyester resins for use in gel coats are based on isophthalic acid, particularly resins formulated from maleic anhydride, isophthalic acid, and neopentyl glycol.

The unsaturated polyester resin can be formulated from the starting materials described above or it can be obtained commercially. Suppliers of suitable unsaturated polyester resins include, for example, CCP Polymers, Interplastic Corporation, Reichhold, Ashland, and others.

For more details about how to make and use unsaturated polyester resins, see W. F. Gum et al., *Reaction Polymers*, supra, at pp. 153-202.

The vinyl ester component, when used, is normally a reaction product of an epoxy resin and an unsaturated carboxylic acid (typically acrylic acid, methacrylic acid, or the like). Epoxide end groups of the epoxy resin react with the hydroxyl group of the unsaturated carboxylic acid to give a resin having terminal unsaturation that is conjugated with an ester carbonyl group. The crosslink density of the cured vinyl ester is controlled by selecting an epoxy resin of desirable molecular weight and polydispersity. In a typical example, an epoxy resin made reacting bisphenol A with epichlorohydrin is further reacted with enough methacrylic acid to convert the epoxide end groups to vinyl ester groups. The same free-radical initiators used to cure unsaturated polyesters are also used to make the vinyl ester component. For more details, see W. F. Gum et al., *Reaction Polymers*, supra, at pp. 190-194 and U.S. Pat. Nos. 3,367,992; 3,996,307; 4,197,390; and 4,296,220, the teachings of which are incorporated herein by reference.

Vinyl ester resins and systems are commercially available from AOC, Ashland, Interplastic, Reichhold, Dow Chemical, and other suppliers.

The epoxy component, when used, is usually made by reacting an epoxy resin—often a diglycidyl ether reaction product of bisphenol A with epichlorohydrin—with a hardener or curing agent such as an aromatic diamine.

Many suitable epoxy resins and curatives are commercially available from Dow Chemical, Huntsman, Royce International, Momentive Specialty Chemicals, West, MAS, Interlux, and others.

Suitable curatives for epoxy resins include, for example, aliphatic amines, cycloaliphatic amines, aromatic amines, polyamides, amidoamines, polysulfides, anhydrides, and the like.

For more examples of epoxy resin classes and curing agents, see W. F. Gum et al., *Reaction Polymers*, supra, at pp. 125-153 and U.S. Pat. Nos. 7,217,771; 6,660,373; 5,919,844; and 5,872,196, the teachings of which are incorporated herein by reference.

The manner in which the urethane and polyester, vinyl ester, or epoxy reactants are combined to produce the gel coats is generally not critical and is left to the discretion of the skilled person. There may be advantages, for instance, to minimizing the number of reactant streams by pre-combining certain components that will not react, then contacting the reactant streams in one shot to produce the co-cured system. We surprisingly found, e.g., that one can simply mix commercial urethane and urea systems with a commercial vinyl ester resin and achieve good results.

The inventive gel coats offer important advantages. Including the urethane component improves toughness, flexibility, and durability so the gel coat is long-lasting and resists cracking and chipping. In contrast to urethane coatings, the gel coats can be applied using an in-mold process while maintaining good adhesion with structural layers. Because the amount of urethane is easily varied, the formulator can use enough urethane to impart needed toughness but also limit the amount of urethane to retain stiffness and keep costs within budget. In some applications, surface appearance is a prime consideration, and the amount of urethane will generally be minimized. For applications not requiring a perfect surface, however, there may be advantages to using a relatively high proportion of urethane to maximize flexibility or resilience.

End-use applications for the gel coats include many fiber-reinforced composite structures that require a smooth, durable outer surface, particularly products produced using an in-mold process. Examples include marine, aircraft, construction, kitchen and bath, wind energy, and other applications.

In another aspect, the invention relates to an elastomeric coating. Like the gel coats described previously, the elastomeric coating also comprises co-cured urethane and vinyl ester, epoxy, or unsaturated polyester components, where "co-cured" has the meaning ascribed above. The urethane and vinyl ester, epoxy, or unsaturated polyester components are combined and reacted under conditions effective to cure both components in the same cure cycle. The urethane, vinyl ester, epoxy, and unsaturated polyester components used to make the elastomeric coating are the same ones described previously. The elastomeric coatings, however, have high urethane content. In particular, the urethane component is from 50 to 95 wt. %, preferably 70 to 90 wt. %, based on the amount of elastomeric coating.

The higher urethane content of the elastomeric coating (compared with the gel coat) makes the coating well-suited for applications that demand greater resilience and flexibility but not necessarily a smooth, glossy surface. Such coatings can be valuable for a submarine bow dome, for instance, where durability trumps appearance. The minor proportion of unsaturated polyester, epoxy, or vinyl ester in the elastomeric coating enables good adhesion to structural layers, so the potential peeling issues of a post-applied polyurethane coating, particularly under high-stress, hydrodynamic conditions, can be avoided. Moreover, unlike traditional polyurethane coatings, the elastomeric coating can be used in an in-mold process as is used for gel coatings.

As was the case with the inventive gel coats, the manner in which reactants are combined for making the elastomeric coatings is not considered critical and is left the skilled person's discretion.

Other potential end-uses for the elastomeric coatings include applications that can benefit from having a flexible, strong outer layer. Examples include marine applications, recreational vehicles, roofing, exterior wall coating, parking structures, cooling towers, and the like.

The invention includes laminates made from the elastomeric coatings or gel coats and one or more structural layers. Laminates include one or more structural layers, at least one of which is bonded to the inventive gel coat or elastomeric coating. Preferably, the structural layer or layers are the inventive structural layers discussed immediately below.

In one aspect, the invention relates to a casting. The casting, which may be reinforced, comprises co-cured urethane and vinyl ester, epoxy, or unsaturated polyester components. The urethane component is from 10 to 95 wt. %, preferably from 10 to 50 wt. %, based on the amount of casting, and the urethane and vinyl ester, epoxy, or unsaturated polyester reactants are combined under conditions effective to cure both components in the same cure cycle. For examples of some unreinforced castings, see Table 1 below. We surprisingly found, for instance, that despite the known flexibility of an all-urethane system, incorporation of 25 wt. % of co-cured urethane into a vinyl ester system increases both tensile strength and stiffness compared with the 100% vinyl ester system.

In another aspect, the invention relates to a structural layer comprising a reinforced thermoset. The thermoset comprises co-cured urethane and vinyl ester, epoxy, or unsaturated polyester components, where "co-cured" has the meaning ascribed above. The urethane and vinyl ester, epoxy, or unsaturated polyester components are combined and reacted under conditions effective to cure both components in the same cure cycle. The urethane, vinyl ester, and unsaturated polyester components used to make the structural layer are the same ones described previously. The urethane component is from 10 to 95 wt. %, preferably from 25 to 75 wt. %, based on the amount of thermoset.

The structural layer is a composite material. It comprises a co-cured resin and reinforcing material. Reinforcement can be in any desired suitable form, such as fibers, fabric, mats, chopped pieces, particles, or the like. The reinforcement can be chopped glass, glass strands, SMC grinds, silicon carbide, quartz, graphite, fiberglass, organic polymers, cellulose fibers, polyamide fibers, polypropylene fibers, carbon fibers, boron fibers, inorganic materials, or the like. Other suitable reinforcing materials are described in U.S. Pat. Nos. 4,921,658 and 6,780,923, the teachings of which are incorporated herein by reference.

The traditional approach of applying multiple structural layers of polyester or vinyl ester can be used. Because the inventive structural layers have urethane content, they can have improved flexibility and toughness compared with the reinforced polyester, epoxy, or vinyl ester layers. Moreover, the structural layers adhere well to each other and to traditional coatings or the inventive gel coats and elastomeric coatings, so delamination or peeling is avoided.

In one aspect, the invention relates to a laminate comprising two or more of the inventive structural layers described above, wherein each structural layer comprises urethane and vinyl ester, epoxy, or unsaturated polyester components. The layers can be arranged in any desired order to optimize properties. Various combinations might be employed, for instance to include a viscoelastic layer useful for damping, a layer having shock-absorbing properties, or a layer sequence that optimizes acoustic properties of the laminate.

Urethane content can be "dialed in" for each layer, so multilayer laminates can be fabricated that have a desired gradient of flexibility, toughness, tensile strength, elongation, and other important properties. For instance, a material that has a highly flexible exterior but stiffer inner layers could be made using an elastomeric coating of the invention as an outer coat, followed by a structural layer of polypropylene-reinforced resin with 50 wt. % urethane, followed by a structural layer of glass fiber-reinforced resin with 25 wt. % urethane, followed by an inner layer of carbon fiber-reinforced vinyl ester resin.

In another aspect, the invention relates to a multilayer laminate comprising two or more of the inventive structural layers described above, wherein each structural layer comprises urethane and vinyl ester, epoxy, or unsaturated polyester components, and each successive structural layer comprises progressively more of the urethane component.

Thus, in some applications, it might be more desirable to have greater flexibility in the innermost layers of a multilayer laminate, so the ordering can be reversed. Thus, after applying a traditional gel coat, structural layers having progressively more urethane could be applied to build more flexibility into the inner part of the multilayer structure.

The ability to control the amount of urethane in each layer while maintaining good interlayer adhesion provides a unique opportunity to control the degree of elongation of each reinforced structural layer and identify structures with the most desirable balance of physical and mechanical properties.

The structural layers are usually non-cellular, but if desired, a blowing agent can be included to impart a cellular or microcellular structure. It is also possible to utilize structural layers comprising a rigid, semi-rigid, or flexible foam as part or all of the layer. Foams are particularly desirable in applications for which weight reduction is important, as in the marine, automotive, or aerospace industries.

In another aspect, the invention relates to an in-mold process for making a laminate. The process comprises applying to a mold a layer of co-curable gel coat formulation. The gel coat formulation comprises the urethane and vinyl ester, epoxy, or unsaturated polyester components described earlier. The urethane component is from 10-50 wt. % based on the amount of gel coat formulation. Before or after the gel coat layer cures, at least one structural layer is applied to the gel coat layer, and the layers are allowed to cure to produce the laminate. Preferably, the structural layer is an inventive structural layer as described herein comprising co-cured urethane and unsaturated polyester, epoxy, or vinyl ester components. Typically, structural layers are applied after the gel coat layer has substantially cured.

In another aspect, the invention relates to an in-mold process for making a laminate. The process comprises applying to a mold a layer of a co-curable elastomeric coating formulation. The elastomeric coating comprises the urethane and the vinyl ester, epoxy, or unsaturated polyester components (including possibly a conventional gel coat) described earlier. The urethane component is from 50-95 wt. % based on the amount of elastomeric coating. Before or after the elastomeric coating layer cures, at least one structural layer is applied to the elastomeric coating layer, and the layers are allowed to cure to produce the laminate. Preferably, the structural layer is an inventive structural layer as described herein comprising co-cured urethane and unsaturated polyester, epoxy, or vinyl ester components. Typically, structural layers are applied after the elastomeric coating layer has substantially cured.

In yet another aspect, the invention relates to an in-mold process for making a laminate. The process comprises applying to a mold a layer of a gel coat formulation, typically a conventional gel coat. Before or after the gel coat layer cures, typically thereafter, at least one structural layer is applied to the gel coat layer, and the layers are allowed to cure to produce the laminate. The structural layer comprises a reinforced thermosetable composition. The thermosetable composition comprises co-curable urethane and vinyl ester, epoxy, or unsaturated polyester components. The urethane component is from 10 to 95 wt. % based on the amount of thermosetable composition, and the urethane and vinyl ester, epoxy, or unsaturated polyester reactants are combined under conditions effective to cure both components in the same cure cycle.

In an exemplary application, the inventive elastomeric coatings and/or structural layers are used to construct a fiber-reinforced plastic sonar dome for a naval vessel, e.g., a submarine (see, e.g., U.S. Pat. Nos. 4,997,705 and 7,638,085, the teachings of which are incorporated herein by reference). The inventive compositions impart good acoustic performance, high strength to weight ratio, good fatigue and impact resistance, good noise and vibration damping, corrosion resistance, and ease of maintenance to the sonar dome.

Like other marine composite structures, the multilayer structure of a sonar dome must be able to withstand substantial out-of-plane loads caused by wave slamming, localized impacts, and other shock events. The outer surfaces need to handle increased strain rates to help the stiffer inner layers contribute to the structure's robustness. By transitioning the modulus of the structure from lower to higher values in multiple layers, interlaminar loads can be reduced, the entire laminate can function as one system, and optimum performance, damping, and survivability can be achieved.

The inventive coatings and structural layers can meet the challenges noted above because strain to failure values can be adjusted from elastomeric (>100% strain to failure) to that of a conventional vinyl ester resin (5-7% strain to failure), typically by simply adjusting urethane content. Thus, a multilayer laminate can be optimized ply-by-ply to give optimized toughness and strain to failure throughout the structure. High-strain (elastomeric) plies can be used on exterior surfaces, while stiffer plies can be used as the neutral axis (minimum displacement under stress) of the structure is approached.

The robustness, acoustic properties, cost, and other aspects of the sonar dome can be further controlled by altering the nature of the reinforcing material, including the fabric architecture, fiber type, and other factors. Fibers and fabrics can be selected and combined, comingled, or oriented to optimize any of these benefits. For instance, organic polymer fibers such as polypropylene might be used in combination with glass and/or carbon fibers. For further discussion of how to optimize acoustic performance with blended yarns and fabrics, see U.S. Pat. No. 7,638,085.

The process used to manufacture the dome will also have an impact on properties and cost. Preferably, resin infusion methods such as vacuum-assisted resin-transfer molding are used. A multicure infusion process, which allows production of optimized structures, is particularly preferred. Vacuum-assisted resin-transfer molding is a cost-effective alternative to conventional pre-impregnation techniques (see, e.g., U.S. Pat. Nos. 7,980,840; 7,189,345, and 6,159,414, the teachings of which are incorporated herein by reference).

For example, the outer surface of the sonar dome can be an unreinforced elastomeric coating of the invention comprising 50-95 wt. %, preferably from 75 to 90 wt. %, of the urethane component. Next, a series of structural layers comprising optimized fabrics can be placed over the elastomeric coating and infused with a high strain to failure (i.e., elastomeric) resin. The next series of optimized structural layers would comprise fabrics placed and infused with a lower strain to failure (but stiffer) resin. The layering process continues until the structure's neutral axis is reached, after which the infusions would use fabrics and resins suited for progressively higher strain to failure. This cost-effective strategy provides a sonar dome having optimum acoustic and damping properties, impact resistance, and survivability.

The following examples merely illustrate the invention. Those skilled in the art will recognize many variations that are within the spirit of the invention and scope of the claims.

Example A

A commercial vinyl ester resin, CoREZYN® VE8121 (product of Interplastic), is stirred with MEKP/Co catalyst at room temperature. At the same time, the A and B components of Selby™ N300 CR, a two-part urethane floor coating (product of BASF) are combined at room temperature. The catalyzed vinyl ester and urethane components are quickly mixed (50:50 weight ratio), and the mixture is brushed onto a mold and allowed to cure. After the coating cures, a conventional skin coat of polyester resin is applied, and thereafter, additional structural layers are laminated. The fully cured sample is removed from the mold. It has excellent adhesion and elasticity. Excellent adhesion is also demonstrated with co-cured 25 wt. % urethane/75 wt. % vinyl ester as the in-mold gel coating. This sample is somewhat less elastic than the sample having the 50/50 urethane/vinyl ester blend as the gel coating.

In contrast, when a 100% urethane gel coat is applied and cured, followed by application of a conventional skin coat of polyester resin and additional structural layers, the fully cured product demonstrates poor adhesion of the urethane coating to the structural layers.

Co-Cured Castings

CoREZYN® VE8121 resin (Interplastic) is stirred with MEKP/Co catalyst at room temperature. At the same time, the A and B components of Selby™ N300 CR are combined and stirred briefly at room temperature. The catalyzed vinyl ester and urethane resins are then quickly combined, mixed well, poured into a mold, and allowed to cure. Properties of the resulting unreinforced castings appear in Table 1.

TABLE 1

Co-cured Castings

| Ex # | VE8121 (wt. %) | PU (wt. %) | Tensile strength (psi) | Modulus (kpsi) | Elongation (%) | Shore A hardness |
|---|---|---|---|---|---|---|
| C1 | 100 | 0 | 2100 | 120 | 2.1 | — |
| 2 | 75 | 25 | 6500 | 710 | 1.0 | — |
| 3 | 25 | 75 | 650 | 3.7 | 16 | 93 |
| 4 | 12.5 | 87.5 | 400 | 1.1 | 38 | 81 |

VE8121 = CoREZYN® VE8121, a vinyl ester resin (Interplastic).
PU = Selby™ N300 CR urethane (BASF).

The results in Table 1 illustrate the wide variety of properties available depending upon the proportion of urethane included in the co-cured system. Note the substantial increase in tensile strength upon inclusion of just 25 wt. % urethane (Example 2 versus Comparative Example 1). The nature of the product changes dramatically (to softer materials) when the urethane is the major component of the co-cured system (Examples 3 and 4).

Coated Laminates

Test laminates are constructed using Maxguard® 33LE-2435 UV grey (Ashland), which is a conventional polyester gel coat (Comparative Example 5), or co-cured blends of a vinyl ester resin with a urethane/urea combination (Examples 6 and 7). Except for the coating formulation, all of the laminates are prepared using the same base resin and procedure. The laminates are tested for flexural modulus and strength properties in accord with ASTM D790. All samples are tested at the same support span. The stress level, the deflection at the time of coating crack appearance, and the ultimate stress levels are recorded. Results appear in Table 2.

TABLE 2

Coated Laminates: Three-Point Bend Results[1]

| Ex. # | Coating (wt. %) | Stress at coating crack (kpsi) | Deflection at coating crack (in) | Strain at coating crack (in/in) |
|---|---|---|---|---|
| C5 | Polyester gel coat (100) | 19.0 | 0.14 | — |
| 6 | PU (12.5)/urea (12.5)/VE8106 (75) | 23.5 | 0.34 | 0.03 |
| 7 | PU (25)/urea (25)A/E8106 (50) | 24.7 | 0.40 | 0.04 |

Polyester gel coat = Maxguard® 33LE-2435 UV grey (Ashland)
PU = Selby™ N300 CR (BASF); urea = EnviroLastic® polyurea resin (Sherwin-Williams).
VE8106 = CoREZYN® VE8106, a vinyl ester resin (Interplastic).
[1]ASTM D790; support to specimen depth ratio = 16:1.
Values represent an average of 6 test specimens.

Ideally, the coating only cracks when the rest of the structure fails. As Table 2 shows, when a polyester gel coat alone is used to coat the laminate (Comparative Example 5), the coating cracks early, i.e., before the laminate cracks. In Examples 6 and 7, the coating cracks simultaneously with the laminate. At 25 wt. % urethane/urea, the formulation is a modified gel coat (Example 6), while at 50 wt. % urethane/urea, the formulation is better characterized as an elastomeric coating (Example 7).

Additional Coated Laminates

Test laminates are constructed using the conventional polyester gel coat, co-cured blends of the polyester gel coat with urethane, and co-cured blends of a vinyl ester resin with urethane. Except for the coating formulation, all of the laminates are prepared using the same base resin and procedure. The laminates are tested for flexural and strength properties in accord with ASTM D790. All samples are tested at the same support span. The stress level, the deflection at the time of coating crack appearance, and the ultimate stress levels are recorded. Results appear in Table 3.

TABLE 3

Coated Laminates: Three-Point Bend Results[1]

| Ex. # | Coating | Stress at coating crack (kpsi) | Maximum stress (kpsi) | Deflection at coating crack (in) |
|---|---|---|---|---|
| C5 | Polyester gel coat (100) | 19.0 | 23.5 | 0.14 |
| 8 | PU (25)/polyester gel coat (75) | 30.7 | 30.9 | 0.27 |
| 9 | PU (50)/polyester gel coat (50) | 29.5 | 29.7 | 0.29 |
| 10 | PU (75)/polyester gel coat (25) | 26.8 | 27.2 | 0.28 |
| 11 | PU (75)/VE8123 (25) | — | — | 0.27 |

Polyester gel coat = Maxguard® 33LE-2435 UV grey (Ashland)
PU = Selby™ N300 CR (BASF); CoREZYN® VE8123 is a vinyl ester resin (Interplastic).
[1]ASTM D790; support to specimen depth ratio = 16:1.
Values represent an average of 6 test specimens.

Co-curing the urethane and polyester gel coat gives a coated laminate having a substantial increase in deflection at coating crack. When no urethane is present, the gel coat cracks before the laminate fails (Comparative Example 5). In contrast, when 25 wt. % or more urethane is used, the laminate fails at the same time as, or prior to, failure of the coating (Examples 8-11). In co-cured Examples 8-10, the stress at coating crack generally coincides with the maximum stress, so incorporation of the urethane allows for development of full laminate strength. Example 11 shows that the improvement in deflection at coating crack is consistent whether a polyester gel coat or a vinyl ester is used. With 75 wt. % urethane, Examples 10 and 11 are elastomeric coatings. Example 8 (25 wt. % urethane) is a gel coating; Example 9 borders between the two types.

Evaluation of Coating Adhesion Upon Estuary Exposure

Coated laminates are evaluated for adhesion performance following immersion in an estuary environment. Thus, laminates are prepared according to a common procedure and placed in the Indian River Lagoon, a section of the Intracoastal Waterway, east of Melbourne, Fla. Adhesion testing is performed according to ASTM D4541 on samples prior to exposure and after three or six months of exposure to the estuary. Results appear in Table 4.

TABLE 4

Adhesion of Coated Laminates upon Estuary Exposure

| Ex. # | Coating | Adhesive strength by ASTM D4541 (psi) | | |
|---|---|---|---|---|
| | | Un-exposed | 3-Month Exposure | 6-Month Exposure |
| C12 | Polyester gel coat (100) | 1011 | 917 | 735 |
| C13 | EnviroLastic ® polyurea (100) | 416 | 512 | 511 |
| C14 | Line-X ® polyurea (100) | 864 | 866 | 594 |
| 15 | PU (50)/VE8123 (50) | 1070 | 1005 | 908 |
| 16 | PU (50)/polyester gel coat (50) | 1226 | 1387 | 1706 |

Polyester gel coat = Maxguard ® 33LE-2435 UV grey (Ashland)
PU = Selby ™ N300 CR (BASF); CoREZYN ® VE8123 is a vinyl ester resin (Interplastic); EnviroLastic ® polyurea resin (Sherwin-Williams); Line-X ® protective coating (Line-X, Inc.).

The conventional gel coat (Comparative Example 12) shows significant degradation of coating adhesion over time upon exposure to estuary water (~27% loss of adhesive strength after six months). The polyurea coatings (Comparative Examples 13 and 14) have lower adhesive strength and exhibit the lowest values after six-month water exposure. In contrast, the urethane/vinyl ester and urethane/polyester gel coat co-cures (Examples 15 and 16, respectively) demonstrate better initial adhesion and a reduced degree of degradation upon three- or six-month exposure to the estuary. The results with the urethane/polyester gel coat are particularly remarkable, as this co-cure not only shows the best overall adhesion, but the adhesive strength actually increases, and does so dramatically (almost 40%), upon six-month water exposure.

The preceding examples are meant only as illustrations. The following claims define the invention.

I claim:

1. A gel coat comprising co-cured polyurethane and vinyl ester, epoxy, or non-hydroxyl-terminated unsaturated polyester components, wherein the ratio of the polyurethane component to the vinyl ester, epoxy, or polyester component, or combination thereof is from 10:90 to 50:50 by weight.

2. A curable composition comprising a mixture of (a) one or more polyisocyanate components; (b) one or more polyol components; and (c) one or more vinyl ester, epoxy, or unsaturated polyester components, or a combination thereof; wherein the ratio of (a) and (b) to (c) is from 10:90 to 50:50 by weight and where the composition is adapted for preparing polyurethane.

3. The curable composition of claim 2 wherein the ratio of (a) and (b) to (c) is from 10:90 to 25:75 by weight.

4. The curable composition of claim 2 wherein the ratio of (a) and (b) to (c) is from 10:90 to 20:80 by weight.

5. The curable composition of claim 2 wherein the ratio of (a) and (b) to (c) is from 10:90 to 15:85 by weight.

6. The curable composition of claim 2 wherein the polyisocyanate component comprises an aliphatic polyisocyanate.

7. The curable composition of claim 2 wherein the polyisocyanate component comprises hexamethylene diisocyanate, hydrogenated 4,4'-diphenylmethane diisocyanates, cyclohexane diisocyanate, isophorone diisocyanate, trimethylhexamethylene diisocyanate, or tetramethylhexamethylene diisocyanate, or a combination thereof.

8. The curable composition of claim 2 comprising the polyester component.

9. The curable composition of claim 8 wherein the polyester component comprises a polymer made from one or more glycols including neopentyl glycol, and one or more dicarboxylic acids.

10. The curable composition of claim 8 wherein the polyester component comprises a polymer made from one or more glycols, and one or more dicarboxylic acids including isophthalic acid or maleic anhydride, or a combination thereof.

11. The curable composition of claim 8 wherein the polyester component comprises a polymer made from maleic anhydride, isophthalic acid, and neopentyl glycol.

12. The curable composition of claim 8 wherein the polyester component comprises styrene.

13. The curable composition of claim 2 comprising the vinyl ester component.

14. The curable composition of claim 13 wherein the vinyl ester component comprises a polymer made from bisphenol A, epichlorohydrin, and methacrylic acid.

15. The curable composition of claim 13 wherein the vinyl ester component comprises styrene.

16. A composition comprising the cured reaction products of the curable composition of claim 2.

17. A composition comprising a gel coat prepared by contemporaneously curing the curable composition of claim 2.

18. A laminate comprising the composition of claim 17 and a structural layer.

19. The laminate of claim 18 wherein the structural layer comprises a cured resin and a reinforcing material.

20. The laminate of claim 19 wherein the reinforcing material comprises chopped glass, glass strands, SMC grinds, silicon carbide, quartz, graphite, fiberglass, organic polymers, cellulose fibers, polyamide fibers, polypropylene fibers, carbon fibers, boron fibers, or inorganic materials, or a combination thereof.

21. The laminate of claim 19 wherein the resin comprises a curable composition comprising a mixture of (x) one or more polyisocyanate components; (y) one or more polyol components; and (z) one or more vinyl ester, epoxy, or unsaturated polyester components, or a combination thereof; wherein the ratio of (x) and (y) to (z) is from 10:90 to 50:50 by weight.

22. The laminate of claim 21 wherein the ratio of (x) and (y) to (z) in the resin is equal to or less than the ratio of (a) and (b) to (c) in the curable composition.

23. A kit comprising (a) one or more polyisocyanate components; (b) one or more polyol components; (c) one or more vinyl ester, epoxy, or unsaturated polyester components, or a combination thereof; and (d) instructions for mixing (a), (b), and (c) in a ratio of (a) and (b) to (c) in the range from 10:90 to 50:50 by weight; and contemporaneously curing the mixture of (a), (b), and (c) to prepare polyurethane.

24. The kit of claim 23 wherein (b) and (c) are a mixture.

25. The kit of claim 23 wherein the mixture is cured to form a gel coat.

26. The kit of claim 23 further comprising instructions for applying (a), (b), and (c) to a mold.

* * * * *